United States Patent [19]

Blair

[11] 4,127,178

[45] Nov. 28, 1978

[54] EARTH WORKING ATTACHMENT

[76] Inventor: Calvin B. Blair, P.O. Box 97, Barnard, Kans. 67418

[21] Appl. No.: 804,578

[22] Filed: Jun. 8, 1977

[51] Int. Cl.² ............... A01B 21/04; A01B 49/02
[52] U.S. Cl. .................. 172/198; 172/178; 172/615; 172/624; 172/626; 172/643
[58] Field of Search ........... 172/142, 178, 197, 198, 172/313, 615, 617, 618, 619, 620, 621, 622, 624, 643, 646, 657, 626

[56] References Cited

U.S. PATENT DOCUMENTS

| | | | |
|---|---|---|---|
| 693,882 | 2/1902 | Morrison | 172/621 X |
| 1,113,219 | 10/1914 | Kiggins | 172/178 |
| 2,321,663 | 6/1943 | Donovan | 172/621 X |
| 2,986,828 | 6/1961 | Lapins et al. | 172/197 |
| 3,500,936 | 3/1970 | Vigen | 172/198 |
| 3,774,694 | 11/1973 | Gates | 172/617 |
| 3,921,726 | 11/1975 | Connor et al. | 172/646 |
| 3,991,831 | 11/1976 | Foster | 172/198 |
| 4,029,155 | 6/1977 | Blair et al. | 172/142 X |

FOREIGN PATENT DOCUMENTS 1,250,290  11/1960  France ........................... 172/197

Primary Examiner—Richard T. Stouffer
Attorney, Agent, or Firm—Fishburn, Gold & Litman

[57] ABSTRACT

An attachment for an earth working apparatus having a mobile frame with central and wing sections, each with forward and rear frame members and a plurality of earth working members thereon. The attachment includes a plurality of reach arms for each section and having a forward end portion thereof connected to the forward and rear frame members of the respective frame section. A vertically adjustable hanger unit is swingably mounted on each reach arm and has a tool bar carrying support member swingably mounted thereon. Each hanger unit is constructed so as to permit an elongated, adjustable drag tension spring to have unusually great length such as by allowing a lower end portion to be connected to the respective support member rearwardly of the hanger unit and an upper end portion to be connected to the respective reach arm forwardly of the hanger unit.

7 Claims, 5 Drawing Figures

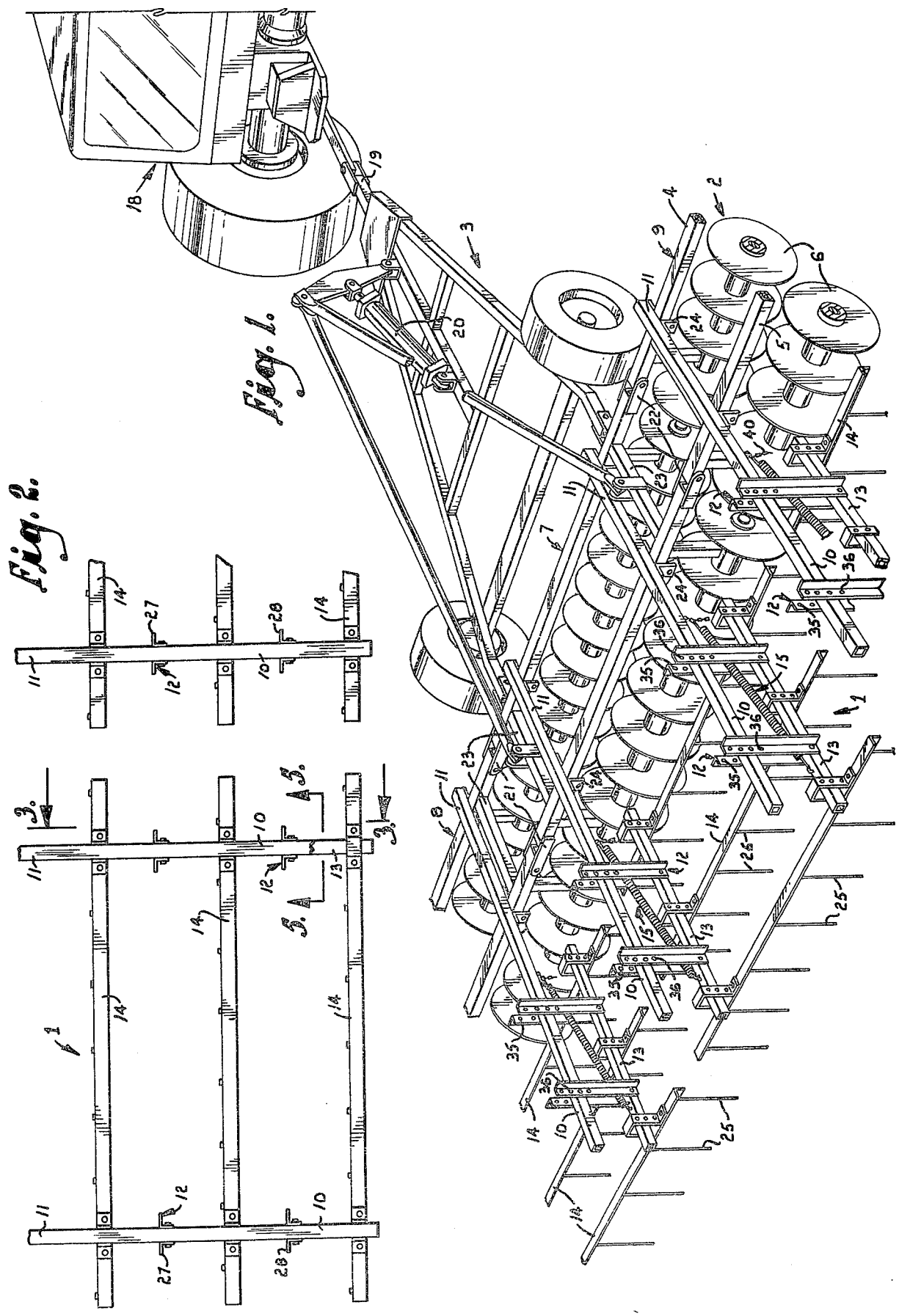

EARTH WORKING ATTACHMENT

The present invention relates to earth working apparatus and more particularly to a drag attachment adjustably and swingably mounted rearwardly of an earth working apparatus.

The principal objects of the present invention are: to provide an attachment for use with an earth working apparatus having a center frame section and foldable end wing frame sections with the attachment being adjustable for depth of working and incline of the attachment; to provide such an attachment including an adjustably mounted resilient member for varying the force urging ground penetration of tools on the attachment; to provide such an attachment wherein the attachment is a flexible tooth drag with the force of penetration being adjustable; to provide such an attachment including reach arms rigidly connected to the frame sections of the earth working apparatus and cantilevered rearwardly therefrom; to provide such an attachment for an earth working apparatus which is particularly efficient for preparing a seed bed immediately after the ground has been worked; and to provide such an attachment which is economical to manufacture, durable in construction, easy to adjust, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the earth working attachment.

FIG. 1 is a perspective view of an earth working apparatus having mounted thereon a drag attachment embodying features of the present invention.

FIG. 2 is a fragmentary top plan view of the drag attachment.

Figure 3:
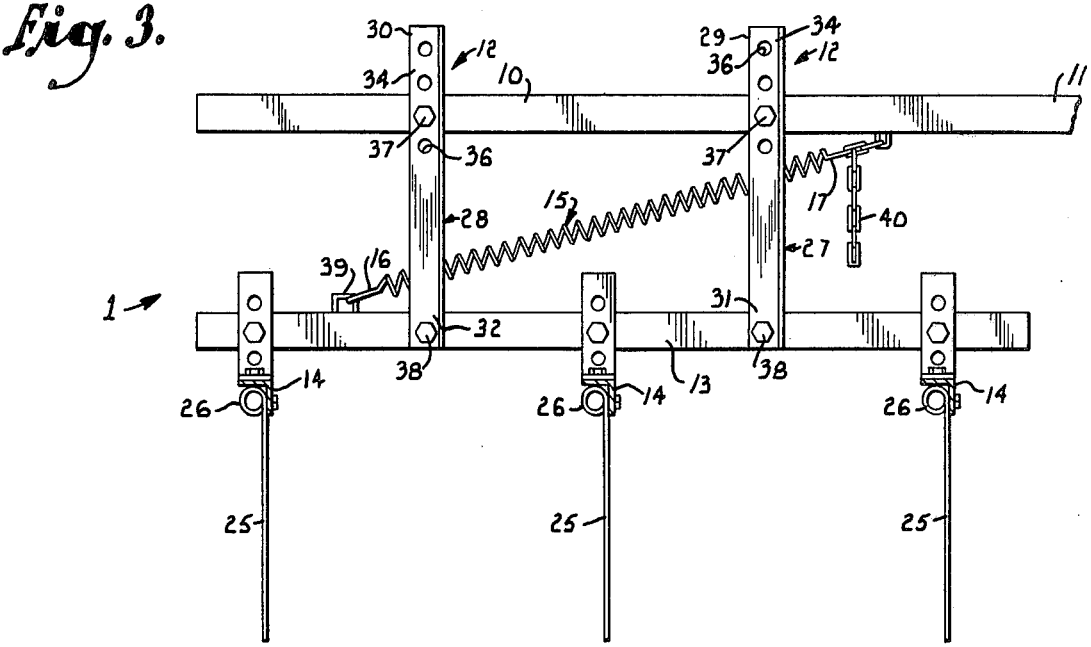
FIG. 3 is an enlarged fragmentary longitudinal sectional view taken on line 3—3 of FIG. 2 and showing the drag attachment adjusted to a level position.
Figure 4:
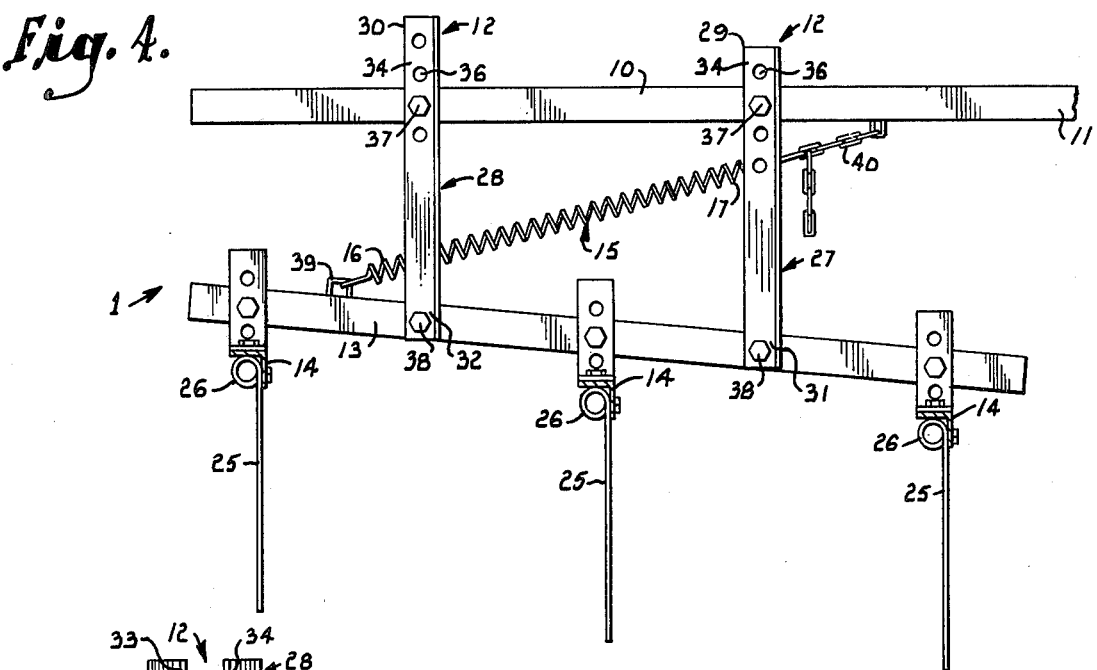
FIG. 4 is an enlarged fragmentary longitudinal sectional view similar to FIG. 3 except showing the drag attachment inclined to have a leading edge portion thereof lower than a trailer edge portion.
Figure 5:
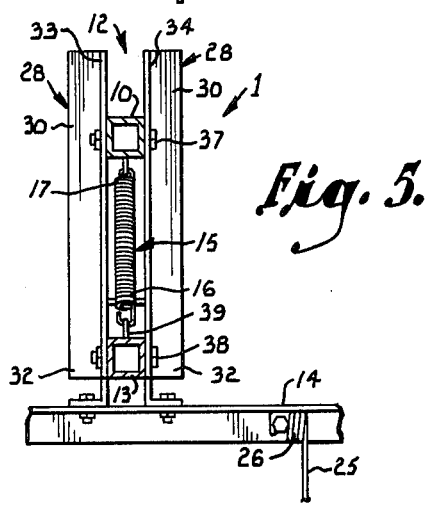
FIG. 5 is an enlarged fragmentary transverse sectional view taken on line 5—5 of FIG. 2 and showing an adjustable hanger unit.

Referring more in detail to the drawings:

In the disclosed embodiment of the present invention, the reference numeral 1 designates generally an attachment for an earth working apparatus 2 having a mobile frame 3 with a forward frame member 4, a rear frame member 5, and a plurality of earth working members 6 thereon. The mobile frame 3 has a center section 7 and a pair of wing sections 8 and 9 hingedly mounted on respective opposite ends thereof. An attachment 1 is mounted on each of the frame sections of the earth working apparatus 2 and is adjustable for either heavy (aggressive) or light dragging of the ground or earth surface in the preparation of a seed bed.

The attachment 1 includes a plurality of laterally spaced reach arms 10 for each section of the mobile frame 3 and each reach arm 10 has a forward end portion 11 thereof connected both to the forward frame member 4 and the rear frame member 5 of the respective frame section. A hanger unit 12 is dependently swingably mounted on each reach arm 10 and has a support member 13 swingably mounted on the lower portion thereof. A plurality of tool bars 14 are mounted on the support members 13. Each hanger unit includes, in this example, an elongated resilient member 15 having a lower end portion 16 thereof connected to the respective support member 13 rearwardly of the hanger unit 12 and an upper end portion 17 thereof adjustably connected to the respective reach arm 10 forwardly of the hanger unit 12.

The earth working apparatus 2 is attached to a prime mover 18, such as an agriculture tractor, by a suitable hitch 19. The apparatus 2 is preferably pivotable vertically for transport folding, in this example, by an extensible hydraulic member 20. The earth working members 6 on the apparatus 2 may be any desired tool, such as a chisel, disc, or the like.

The attachment 1 is particularly adapted for use with an earth working apparatus 2 having foldable end or wing sections 8 and 9 connected to the center frame section 7, as by hinges 21 and 22 respectively. Each of the frame sections 7, 8, and 9 of the earth working apparatus 2 have the forward frame member 4 and the rear frame member 5 thereof suitably secured together, as by tie or brace members 23, thereby defining substantially rigid frame sections for supporting the attachment 1 thereon.

Each of the frame sections 7, 8, and 9 has at least a pair of the laterally spaced reach arms 10 mounted thereon. Each of the reach arms 10 has the forward end portion 11 thereof connected to the forward frame member 4 and to the rear frame member 5 by suitable fastening devices 24. The reach arms 10 are suitable tubular structural members, for example, square or rectangular in cross section.

Each of the frame sections 7, 8, and 9 has a support member 13, preferably of similar cross section to the arms 10, and positioned in variable spaced relation therebelow when the apparatus 2 is in an operating position.

The attachment 1 includes a plurality of laterally spaced, generally parallel tool bars 14 mounted on the support members 13. The tool bars 14 are positioned substantially perpendicular or transverse to the direction of travel of the earth working apparatus 2 and are here illustrated as structural angles.

The tool bars 14 having a plurality of ground engaging tools 25 thereon spaced transversely of the direction of apparatus travel. The tools 25 may take several forms including substantially rigid rods or resiliently mounted teeth permitting deflection thereof upon engagement with rocks or other hard or solid objects, the latter being shown. The illustrated tools 25 include a resilient portion or coil spring portion 26 and a ground engaging portion extending therefrom.

Each hanger unit 12 includes a leading hanger 27 and a trailing hanger 28 generally parallel to each other and arranged as a pair extending between the reach arms 10 and the respective support member 13 positioned therebelow. The hangers 27 and 28 have upper end portions 29 and 30 pivotally mounted on the respective reach arm 10 and lower end portions 31 and 32 pivotally mounted on the respective support member 13 whereby the support member 13 and the tool bars 14 are swingably mounted by the hanger unit 12.

Each of the hangers 27 and 28, in this example, is formed of a pair of laterally spaced structural members 33 and 34. In the illustrated embodiment, the members 33 and 34 are positioned on opposite sides of the respective reach arms 10 and support members 13.

The upper end portion of each of the members 33 and 34 includes means permitting adjustment of the spacing between the respective reach arm 10 and the support member 13. In the illustrated embodiment, the hangers 27 and 28 are each defined by angles positioned with the legs thereof arranged in one facing pair and each of the facing legs have a plurality of longitudinally spaced apertures 35 and 36 therein arranged in aligned pairs. Suitable fastening members, such as bolts 37, are removably received in a selected pair of the aligned apertures 35 and 36 and the fastening members 37 extend through the respective reach arm 10. Suitable fastening members, such as bolts 38, are mounted in apertures in the lower end portions 31 and 32 of the leading and trailing hangers 27 and 28 with each bolt 38 extending through the support member 13.

The resilient member or spring 15 for each of the hanger units 12 extends between the pair of laterally spaced structural members 33 and 34 of the leading and trailing hangers 27 and 28. In the illustrated embodiment, the lower end portions 16 of each member 15 has a hook thereon which is adapted to be received in a suitable eye 39 on the upper surface of the respective support member 13. The eye 39 for each support member 13 is positioned rearwardly of the trailing hanger 28 mounted thereon.

The upper end portion 17 of each of the resilient members 15 has a hook thereon adapted to be received in a selected link of a chain 40 mounted on and depending from a lower surface of the reach members 10. In the illustrated embodiment, each chain 40 has the one end thereof suitably mounted on the lower surface of the reach arm 10 and spaced forwardly of the leading hanger 27. This arrangement permits a relatively long tension coil spring to be used, allowing a much greater range of adjustment and deflection characteristics than is easily available in a shorter spring or other type biasing device.

The tension in the resilient member or spring 15 is determined by the link of the chain 40 selected to have the upper end portion 17 of the resilient member 15 connected thereto. By increasing the spring tension, the tools 25 may be urged deeper into the ground surface or the tools 25 may be positioned for light working of the earth surface by decreasing the spring tension. Also, selecting a particular combination of adjustment apertures 35 and 36 in the hangers 27 and 28 allows fast and simple adjustment to produce many combinations of more or less aggressive tilt and penetration of the multiple rows of earth contacting tools 25.

It is to be understood that while one form of this invention has been illustrated and described, it is not to be limited thereto, except insofar as such limitations are included in the following claims.

What I claim and desire to secure by Letters Patent is:

1. A tooth drag attachment for an earth working apparatus and comprising:
   (a) a plurality of laterally spaced reach arms each having a forward end portion thereof capable of being mounted on a frame of an earth working apparatus and extending rearwardly from the frame;
   (b) a plurality of support members each positioned in spaced relation with and below a respective one of said reach arms;
   (c) a leading hanger and a trailing hanger arranged as a unit for each of said reach arms and said associated support member therebelow, said leading hangers and said trailing hangers each having an upper end portion thereof pivotally mounted on said respective reach arm and a lower end portion thereof pivotally mounted on said respective support members;
   (d) means on each of said leading hangers for permitting adjustment of the spacing between said respective reach arm and said respective support member;
   (e) means on each of said trailing hangers for permitting adjustment of the spacing between said respective reach arm and said respective support member whereby said support members of the tooth drag attachment are adjustable relative to said reach arms;
   (f) a plurality of tool bars mounted on and longitudinally spaced along said plurality of support members;
   (g) a plurality of ground engaging teeth for and mounted on each of said tool bars and spaced transversely of the direction of travel of the earth working apparatus; and
   (h) an elongated resilient member for each of said reach arms and said associated support member, said resilient members each having a lower end portion thereof connected to said respective support member, said resilient members each having an upper end portion thereof connected to said respective reach arm.

2. A tooth drag attachment as set forth in claim 1, wherein:
   (a) each of said leading hangers and each of said trailing hangers comprises a pair of laterally spaced members positioned with said respective reach arms and support members therebetween;
   (b) said resilient members each extend between the pair of laterally spaced members of said respective leading hanger and said trailing hanger;
   (c) the lower end portion of each of said resilient members is connected to said respective support member rearwardly of said trailing hanger; and
   (d) the upper end portion of each of said resilient members is adjustably connected to said respective reach arm forwardly of said leading hanger.

3. In combination with an earth working apparatus having a frame with transversely extending and longitudinally spaced forward and rear frame members, said frame having ground engaging members thereon for supporting same during movement of said frame over a ground surface, said frame having a plurality of earth working members thereon, a tooth drag attachment on said frame and comprising:
   (a) at least a pair of reach arms on said earthworking apparatus frame, said reach arms each having a forward end portion thereof connected to said forward and rear frame members;
   (b) a support member positioned in spaced relation with each of said reach arms, said support members each being below one of said respective reach arms when the earth working apparatus frame is in an in-use position;
   (c) hanger means for swingably supporting and support members and including a leading hanger and a trailing hanger for each of said reach arms and said respective support member therebelow, said leading hangers and said trailing hangers each having an upper end portion thereof pivotally mounted on said respective reach arm and a lower end portion thereof pivotally mounted on said respective support member;

(d) a plurality of tool bars longitudinally spaced along and mounted on said support members;

(e) a plurality of ground engaging tools mounted on said tool bars and spaced transversely of the direction of travel of the earth working apparatus; and (f) an elongated resilient member for each of said reach arms and associated support member, said resilient members each having a lower end portion thereof connected to said respective support member, said resilient members each having a lower end portion thereof connected to said respective support member, said resilient members each having an upper end portion thereof adjustably connected to said respective reach arm, at least one of the end portions of said resilient members being positioned beyond said respective hanger means, (g) a portion of each of said leading hangers including means for permitting adjustment of the spacing between said respective reach arm and said respective support member; and (h) a portion of each of said trailing hangers including means for permitting adjustment of the spacing between said respective reach arm and said respective support member whereby said support members and the tool bars thereon of the tooth drag attachment are adjustable relative to said reach arms.

4. The combination as set forth in claim 3 wherein:

(a) each of said leading hangers and each of said trailing hangers comprises a pair of laterally spaced members positioned on opposite sides of said respective reach arms and support member; and (b) said resilient members each extend between and beyond the pair of laterally spaced members of said respective leading hanger and said respective trailing hanger.

5. A tooth drag attachment for an earth working apparatus and comprising:

(a) a plurality of laterally spaced reach arms each having a forward end portion thereof capable of being mounted on a frame of an earth working apparatus and extending rearwardly from the frame;

(b) a plurality of support members each positioned in spaced relation with and below a respective one of said reach arms;

(c) a leading hanger and a trailing hanger arranged as a unit for each of said reach arms and said associated support member therebelow, said leading hangers and said trailing hangers each having an upper end portion thereof pivotally mounted on said respective reach arm and a lower end portion thereof pivotally mounted on said respective support member;

(d) a plurality of tool bars mounted on and longitudinally spaced along said plurality of support members;

(e) a plurality of ground engaging teeth for and mounted on each of said tool bars and spaced transversely of the direction of travel of the earth working apparatus; and (f) an elongated resilient member for each of said reach arms and said associated support member, said resilient members each having a lower end portion thereof connected to said respective support member rearwardly of said trailing hanger, said resilient members each having an upper end portion thereof connected to said respective reach arm forwardly of said leading hanger, (g) means on each of said leading hangers for permitting adjustment of the spacing between said respective reach arm and said respective support member; and (h) means on each of said trailing hangers for permitting adjustment of the spacing between said respective reach arm and said respective support member whereby said support members and the tool bars thereon of the tooth drag attachment are adjustable relative to said reach arms.

6. A tooth drag attachment for an earth working apparatus and comprising:

(a) a plurality of laterally spaced reach arms each having a forward end portion thereof capable of being mounted on a frame of an earth working apparatus and extending rearwardly from the frame;

(b) a plurality of support members each positioned in spaced relation with and below a respective one of said reach arms;

(c) a leading hanger and a trailing hanger arranged as a unit for each of said reach arms and said associated support member therebelow, said leading hangers and said trailing hangers each having an upper end portion thereof pivotally mounted on said respective reach arm and a lower end portion thereof pivotally mounted on said respective support member;

(d) a plurality of tool bars mounted on and longitudinally spaced along said plurality of support members;

(e) a plurality of ground engaging teeth for and mounted on each of said tool bars and spaced transversely of the direction of travel of the earth working apparatus; and (f) an elongated resilient member for each of said reach arms and said associated support member, said resilient members each having a lower end portion thereof connected to said respective support member rearwardly of said trailing hanger, said resilient members each having an upper end portion thereof connected to said respective reach arm forwardly of said leading hanger, (g) each of said leading hangers and each of said trailing hangers comprises a pair of laterally spaced members positioned with said respective reach arms and support members therebetween;

(h) said resilient members each extend between the pair of laterally spaced members of said respective leading hanger and said trailing hanger;

(i) a portion of each of said leading hangers includes means for permitting adjustment of the spacing between said respective reach arm and said respective support member; and (j) a portion of each of said trailing hangers includes means for permitting adjustment of the spacing between said respective reach arm and said respective support member whereby said support members and the tool bars thereon are adjustably relative to said reach arms.

7. A tooth drag attachment for an earth working apparatus and comprising:

(a) a plurality of laterally spaced reach arms each having a forward end portion thereof capable of being mounted on a frame of an earth working apparatus and extending rearwardly from the frame;
(b) a plurality of support members each positioned in spaced relation with and below a respective one of said reach arms;
(c) a leading hanger and a trailing hanger arranged as a unit for each of said reach arms and said associated support member therebelow, said leading hangers and said trailing hangers each having an upper end portion thereof pivotally mounted on said respective reach arm and a lower end portion thereof pivotally mounted on said respective support member;
(d) a plurality of tool bars mounted on and longitudinally spaced along said plurality of support members;
(e) a plurality of ground engaging teeth for and mounted on each of said tool bars and spaced transversely of the direction of travel of the earth working apparatus; and
(f) an elongated resilient member for each of said reach arms and said associated support member, said resilient members each having a lower end portion thereof connected to said respective support member rearwardly of said trailing hanger, said resilient members each having an upper end portion thereof connected to said respective reach arm forwardly of said leading hanger,
(g) said leading hangers and said trailing hangers each comprising a pair of laterally spaced members;
(h) said resilient members each extending between the pair of laterally spaced members of said respective leading hanger and said respective trailing hanger;
(i) the upper end portion of each of said resilient members being adjustably connected to said respective reach arm forwardly of said leading hanger;
(j) a portion of each of said leading hangers including means for permitting adjustment of the spacing between said respective reach arm and said respective support member; and
(k) a portion of each of said trailing hangers including means for permitting adjustment of the spacing between said respective reach arm and said respective support member whereby said support members and the tool bars thereon are adjustable relative to said reach arms.

* * * * *